(12) United States Patent
Shiga et al.

(10) Patent No.: US 6,838,780 B2
(45) Date of Patent: Jan. 4, 2005

(54) STARTER FOR AN INTERNAL COMBUSTION ENGINE

(75) Inventors: Tsutomu Shiga, Nukata-gun (JP); Masami Niimi, Handa (JP); Masanori Ohmi, Anjo (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/822,824

(22) Filed: Apr. 13, 2004

(65) Prior Publication Data

US 2004/0207204 A1 Oct. 21, 2004

(30) Foreign Application Priority Data

Apr. 18, 2003 (JP) ........................................ 2003-114532

(51) Int. Cl.[7] .............................................. F02N 11/00
(52) U.S. Cl. ............................................ 290/38 R; 74/6
(58) Field of Search ............................... 290/38 R, 45; 74/6, 7 R, 7 E (56) References Cited

U.S. PATENT DOCUMENTS

| | | | | |
|---|---|---|---|---|
| 5,001,412 A | * | 3/1991 | Carter et al. | 322/10 |
| 5,129,271 A | * | 7/1992 | Isozumi et al. | 74/7 R |
| 5,540,110 A | * | 7/1996 | Zenmei et al. | 74/7 A |
| 5,760,485 A | * | 6/1998 | Shiga et al. | 290/38 R |
| 5,945,742 A | | 8/1999 | Araki et al. | |
| 6,040,634 A | * | 3/2000 | Larguier | 290/45 |
| 6,720,696 B2 | * | 4/2004 | Berhan | 310/113 |
| 6,759,756 B2 | * | 7/2004 | Shiga et al. | 290/38 R |

FOREIGN PATENT DOCUMENTS

JP    A 10-115274    5/1998

* cited by examiner

Primary Examiner—Joseph Waks
(74) Attorney, Agent, or Firm—Oliff & Berridge, PLC (57) ABSTRACT

A starter for an internal combustion engine has a resistance ratio $r_M/r_B$ equal to or less than 0.4, when $r_M$ represents a motor internal resistance and $r_B$ represents a battery internal resistance. Furthermore, the starter has a size ratio L/D equal to or less than 1.0, when L represents an axial length of the armature and D represents an outer diameter of the armature. Furthermore, a means for suppressing temperature rise is provided for the starter.

11 Claims, 12 Drawing Sheets

STARTER FOR AN INTERNAL
COMBUSTION ENGINE

BACKGROUND OF THE INVENTION

The present invention relates to a starter used when an internal combustion engine is driven, and more particularly to a starter having a relatively large output.

It is a recent requirement of the starter of an internal combustion engine to be compact in size, light in weight, high in efficiency, and low in cost. To satisfy such requirements, it would be preferable to use a magnet type starter with a high speed-reduction mechanism. Furthermore, the motor itself must be compact. For example, the Japanese Patent Application Laid-open No. 10-115274 corresponding to U.S. Pat. No. 5,945,742 discloses this kind of starter for an internal combustion engine.

In general, a starter works as a motor. A magnet type starter satisfies the relationship V0=Vm+Vr, where V0 represents a power source voltage, Vr represents a voltage drop caused by a combined resistance r composed of a motor internal resistance, a battery internal resistance and a cable resistance between the battery and the motor, Vm represents a counter electromotive force appearing in the armature coil, and i represents a current flowing from the power source to the motor.

Figure 1:
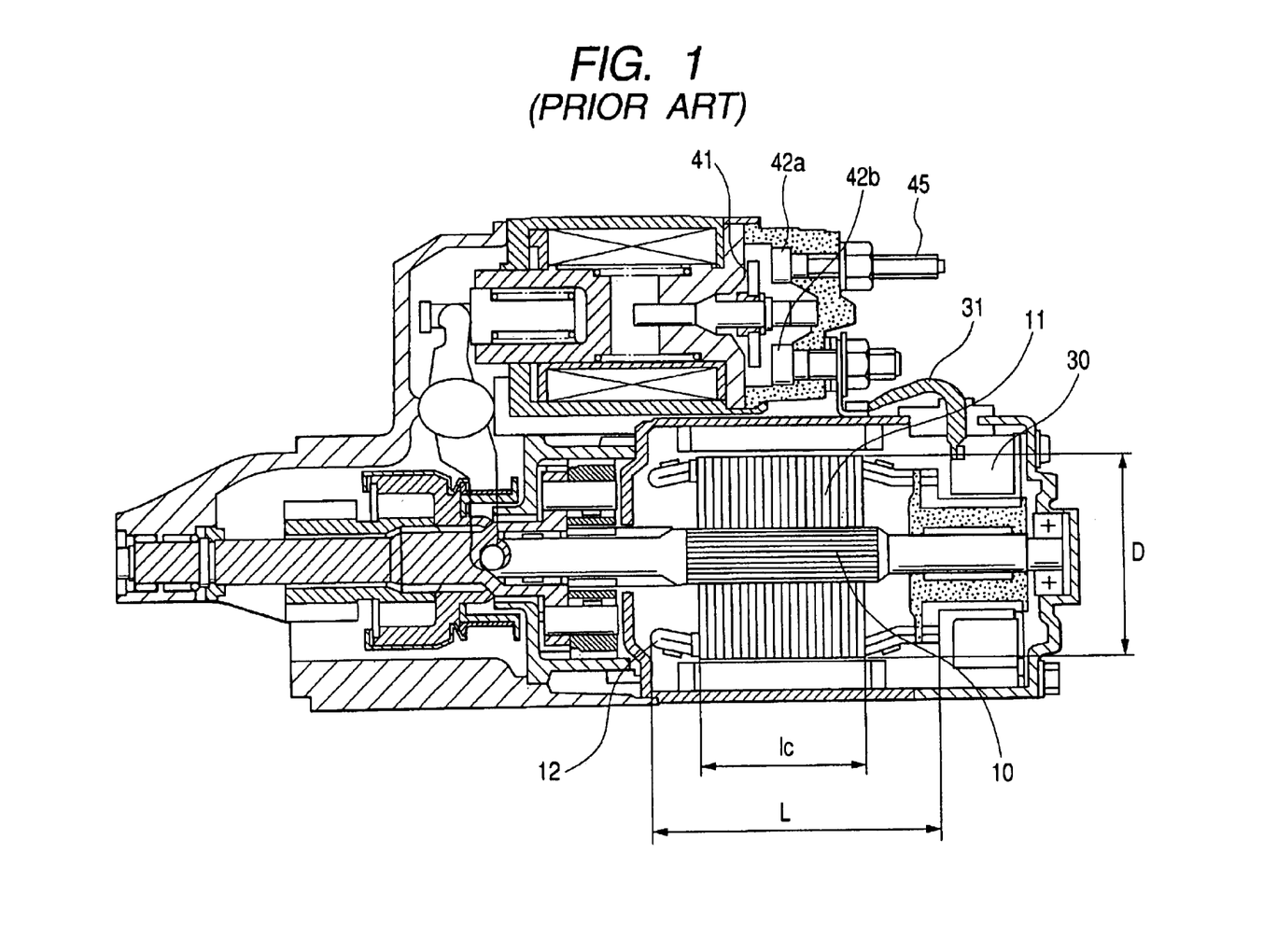
FIG. 1 is a cross-sectional view showing a conventional starter.

When D represents an outer diameter of the armature, lc represents a core width, n represents a rotational speed, and B represents a magnetic flux density of the magnetic field, the following relationship is established.

$$Vm = k1 \cdot B \cdot lc \cdot D \cdot n \text{ and}$$

$$Vr = i \cdot r$$

where k1 is a proportional constant (refer to FIG. 1).
The above equations derive the following relationship.

$$n = (V0 - i \cdot r)/(k1 \cdot B \cdot lc \cdot D)$$

On the other hand, a torque T can be expressed by the following equation.

$$T = k2 \cdot B \cdot lc \cdot D \cdot i$$

where k2 is a proportional constant, and a mechanical loss is, in this case, neglected.

From the above equation, the output W can be expressed by the equation $$W = T \cdot n = k \cdot (lc \cdot 2 \cdot i \cdot r \cdot i^2)$$

where k is a proportional constant.
For example, in case of a 12V battery, V0=12.
Accordingly, a maximum output value Wmax is given by the following equation (1) when the current value is i=6/r.

$$W\text{max} = 36 \cdot k/r \tag{1}$$

When the equation (1) is evaluated in view of compactness of the motor, the factors D and lc which decide the motor dimensions have no relevancy to the output. Reducing these factors D and lc is effective in increasing the rotational speed n but decreases the torque T. However, according to a starter having an internal speed-reduction mechanism, changing the reduction ratio enables the starters to convert them into an arbitrary torque T and an arbitrary rotational speed n on the pinion output shaft. Thus, regarding the compactness, both the torque T and the rotational speed n have no adverse effects on the compact nature of the starters.

More specifically, the motor output increases with decreasing combined resistance r. The following equation (2) expresses the combined resistance r when the vehicle wiring resistance is neglected, wherein $r_B$ represents an internal resistance of the battery and $r_M$ represents an internal resistance of the motor.

$$r = r_B + r_M \tag{2}$$

As a result, reducing the motor internal resistance $r_M$ is a key to obtain a satisfactory output without increasing the size of a motor.

Furthermore, when evaluated with respect to the internal resistance of the starter, the magnet type starter is advantageous in having no series winding resistance.

However, the magnet type starter has the armature resistance $r_A$ and the brush contact resistance $r_T$. Accordingly, the following equation (3) is established.

$$r_M = r_A + r_T \tag{3}$$

The armature resistance $r_A$ has a direct relationship with the motor size (i.e. dimensions). When D represents the outer diameter of the armature and L represents an axial length of a coil constituting the armature (L=core width lc+both coil end lengths) (refer to FIG. 1), the following equation (4) is established.

$$r_A \propto \text{coil length/coil cross-sectional area}$$

$$r_A \propto L/D^2$$

$$r_A \propto L/D \tag{4}$$

The reason why the above-described conversion into the formula (4) is introduced can be explained in the following manner. When the outer diameter is small, the coil cross-sectional area is small too. A circumferential coil length and a radial coil length need to be reduced correspondingly. However, there is a limit in thinning the armature shaft. Thus, in order to secure a sufficient magnetic path area, the radial coil length cannot be decreased proportionally. Hence, it is realistic to replace $D^2$ with D.

In any case, reducing the axial length L of the coil and increasing the outer diameter D of the armature is most effective in increasing the output (in other words, in reducing the armature resistance $r_A$). This conclusion is applicable to a series winding type as well. Accordingly, in both of the magnet type and the series winding type, it is desirable to reduce the axial length of the coil and increase the outer diameter of the armature. In this case, the armature resistance $r_A$ represents a sum of an armature resistance and a field resistance. In short, to increase the output without increasing the size, it is necessary to reduce the value L/D.

Figure 2:
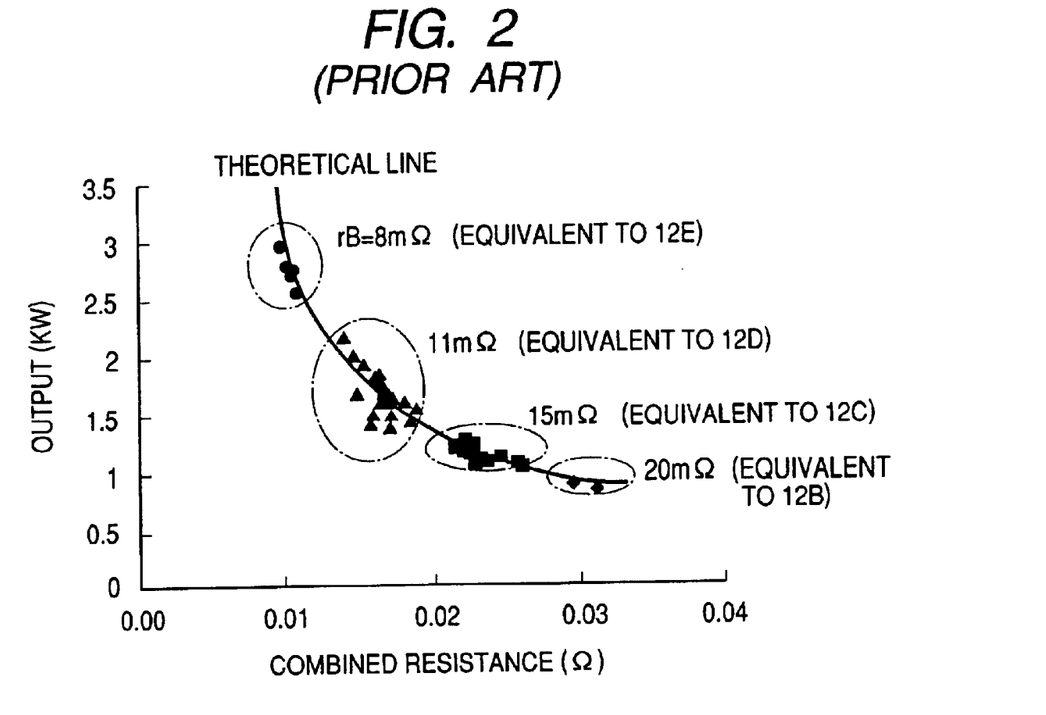
FIG. 2 is a graph showing a relationship between an output and a combined resistance of a conventional starter.

FIG. 2 shows the relationship between an output of a conventional speed-reduction type starter and its combined resistance r. As the graph shows, actual measured data substantially agrees with the theoretical equation (1) shown by a solid line. The data separately shows different values of the internal battery resistance $r_B$. In the drawing, classification of the data is based on the battery notation according to JIS. It is needless to say that a large output starter uses a battery having a small internal resistance $r_B$.

The size of an internal resistance of a representative starter of 1.5 KW class is, for example, expressed by the following combination. In the case of a series winding type, the armature resistance is 2.0 mΩ, the field resistance is 2.0 mΩ, and the brush and other resistances is 1.0 mΩ As a result, a total resistance (i.e. the motor internal resistance $r_M$) is 5.0 mΩ. In the case of a magnet type, the armature resistance is 2.0 mΩ, the field resistance is 0 ml, and the brush and other resistance is 3.0 mΩ. As a result, a total resistance (i.e. motor internal resistance $r_M$) is 5.0 mΩ. In this case, the brush resistance is a value in a dynamic condition. The dynamic condition is a so-called dynamic frictional condition of the brush. To adjust the output, the magnet type uses a brush having a large internal resistance (i.e. having a small-amount of copper) so that the total resistance is equalized to 5.0 mΩ. In general, the series winding uses a carbon brush containing Cu by approximately 70%, while the magnet type uses a carbon brush containing Cu by approximately 60%.

Figure 3:
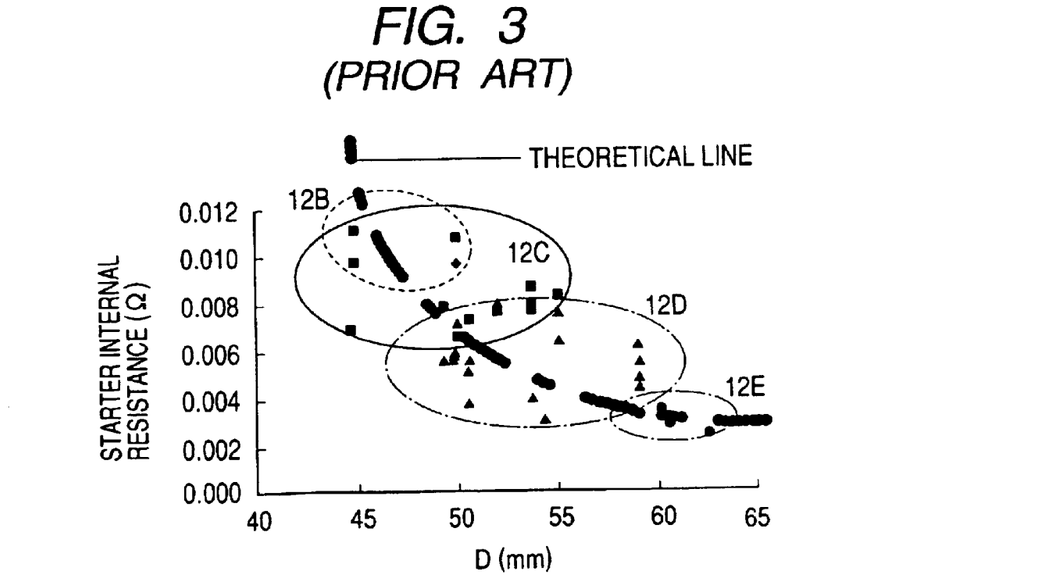
FIG. 3 is a graph showing a relationship between an internal resistance of the conventional starter and an outer diameter D of its armature.
Figure 4:
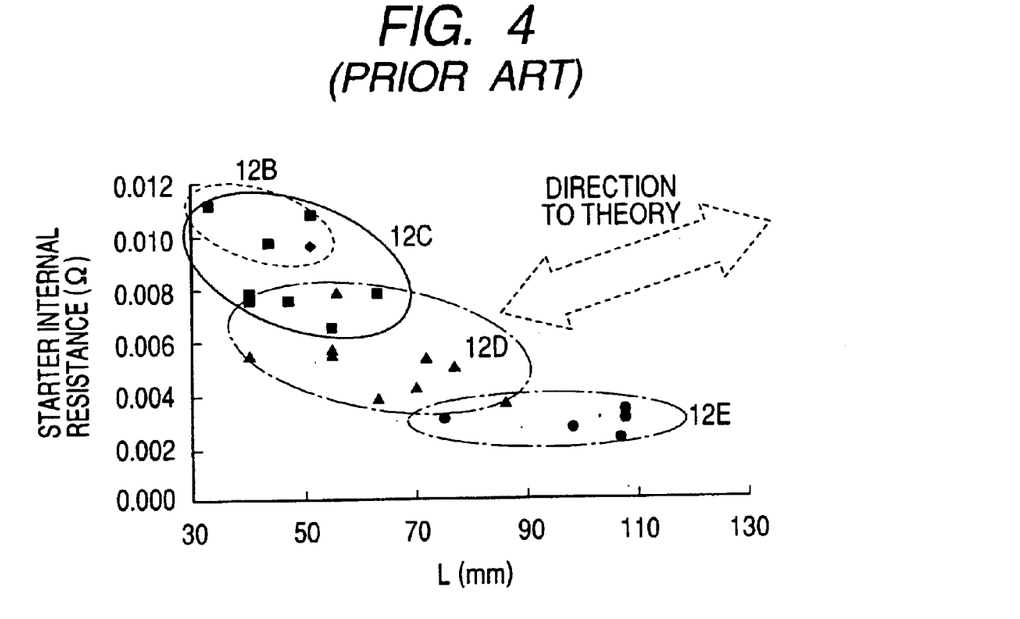
FIG. 4 is a graph showing a relationship between the internal resistance of the conventional starter and a coil width L of its armature.
Figure 5:
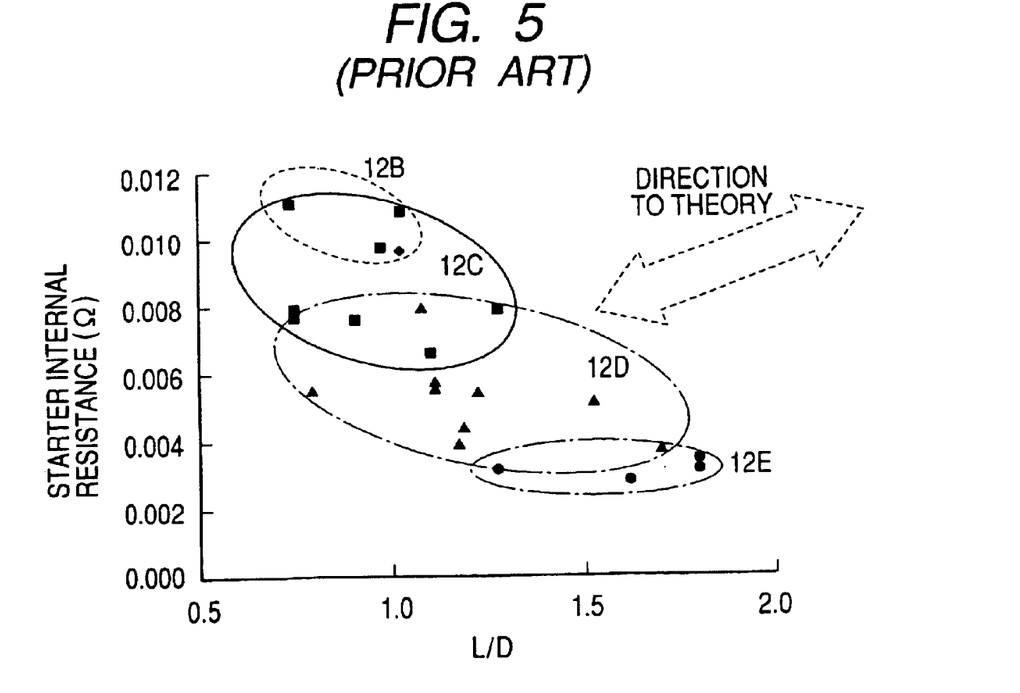
FIG. 5 is a graph showing a relationship between the internal resistance of the conventional starter and a size ratio L/D.

In any case, approximately a half of the motor internal resistance $r_M$ is the armature resistance $r_A$. Accordingly, the combined resistance r becomes small and the output increases with decreasing armature resistance $r_A$. According to the formula (4), the armature resistance $r_A$ becomes small with increasing D or with decreasing L (or the ratio L/D). FIGS. 3, 4, and 5 show conventional examples.

The data shown in these drawings are classified into several groups according to the internal resistance of the battery. The relationship between $r_M$ and D is substantially theoretical. However, the relationship between $r_M$ and L or L/D is contrary to the theory. This is believed that, although L should be small to attain compactness and light weight, the heat capacity ($D^2L$) of the starter should be enlarged to suppress the temperature rise when heat is generated. Increasing L is thus preferable in securing the heat resistivity. On the other hand, there may be a method for securing a sufficient heat capacity by increasing D. However, from the restriction such as the ring gear of an engine not being able to be enlarged, the pinion of a starter is then inevitably determined to a predetermined position and accordingly D cannot be enlarged. Furthermore, the circumferential speed of the brush will increase and accordingly a great amount of frictional heat will be produced. From these circumstances, the compactness and light weight must be sacrificed to assure a sufficient length L. As a result, no consideration about compactness is conventionally involved in optimizing the actual design relating to the dimension L/D. This tendency is remarkable when the battery scale becomes large because its current increases.

Figure 6:
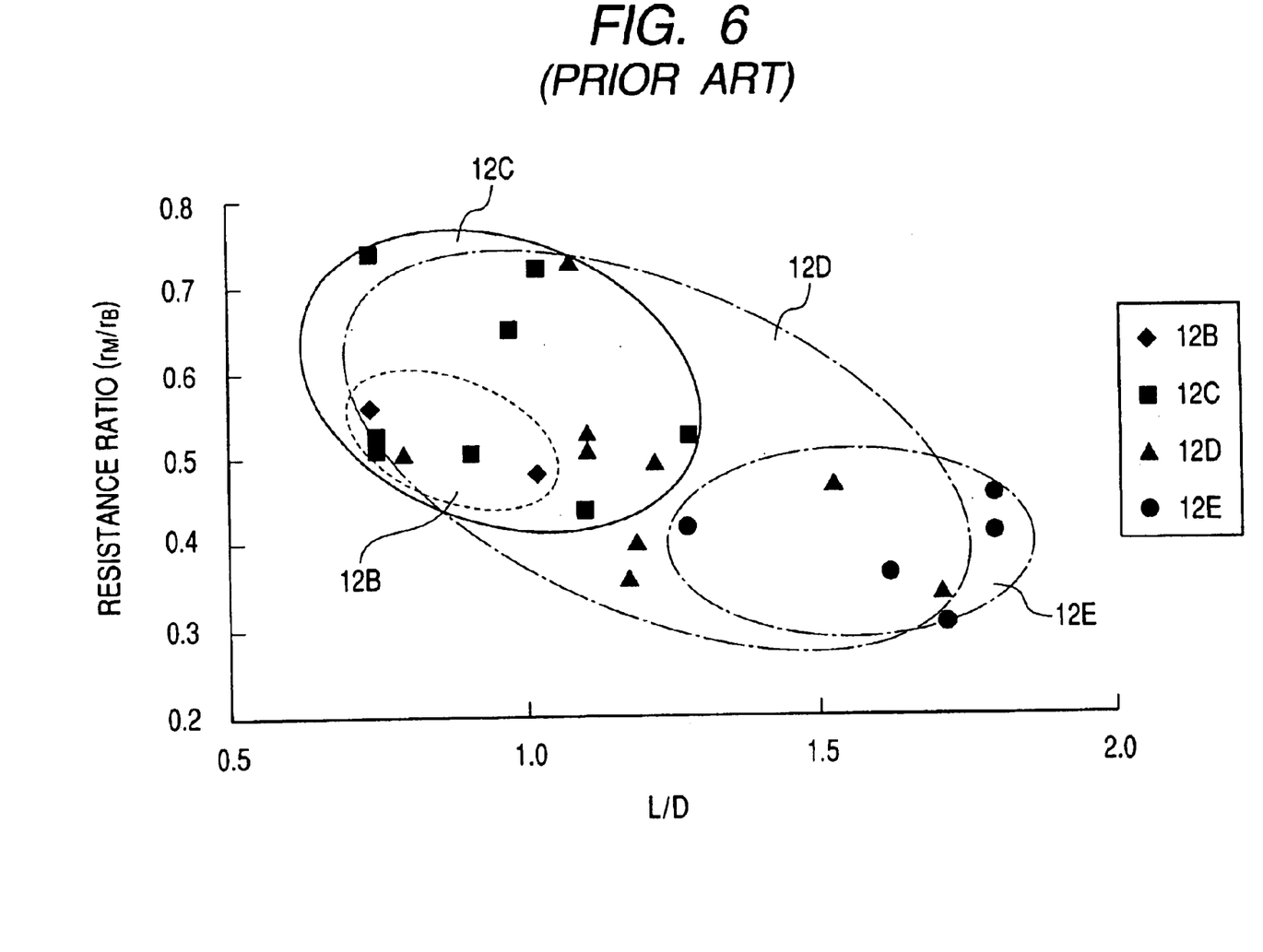
FIG. 6 is a graph showing a relationship between a resistance ratio of the conventional starter and the size ratio L/D.

FIG. 6 shows the relationship between $r_M/r_B$ and L/D to clearly (i.e. to exclude the influence of the battery) show the relationship between the battery scale and the starter resistance according to conventional starter data, in which $r_M/r_B$ represents a resistance ratio of the internal resistance $r_M$ of the starter motor to the internal resistance $r_B$ of the battery.

Reducing the size ratio L/D in the motor design will result in increase of the output. However, as shown in FIG. 6, when the resistance ratio is small (i.e. when $r_M$ is small compared with $r_B$), L/D tends to be large. This is contrary to the above-described motor characteristic theory. In short, the practical starters are compact (i.e. relatively small in the value L/D) when the resistance ratio is equal to or larger than 0.4 but are not compact (i.e. relatively large in the value L/D) when the resistance ratio is smaller than 0.4.

Figure 7:
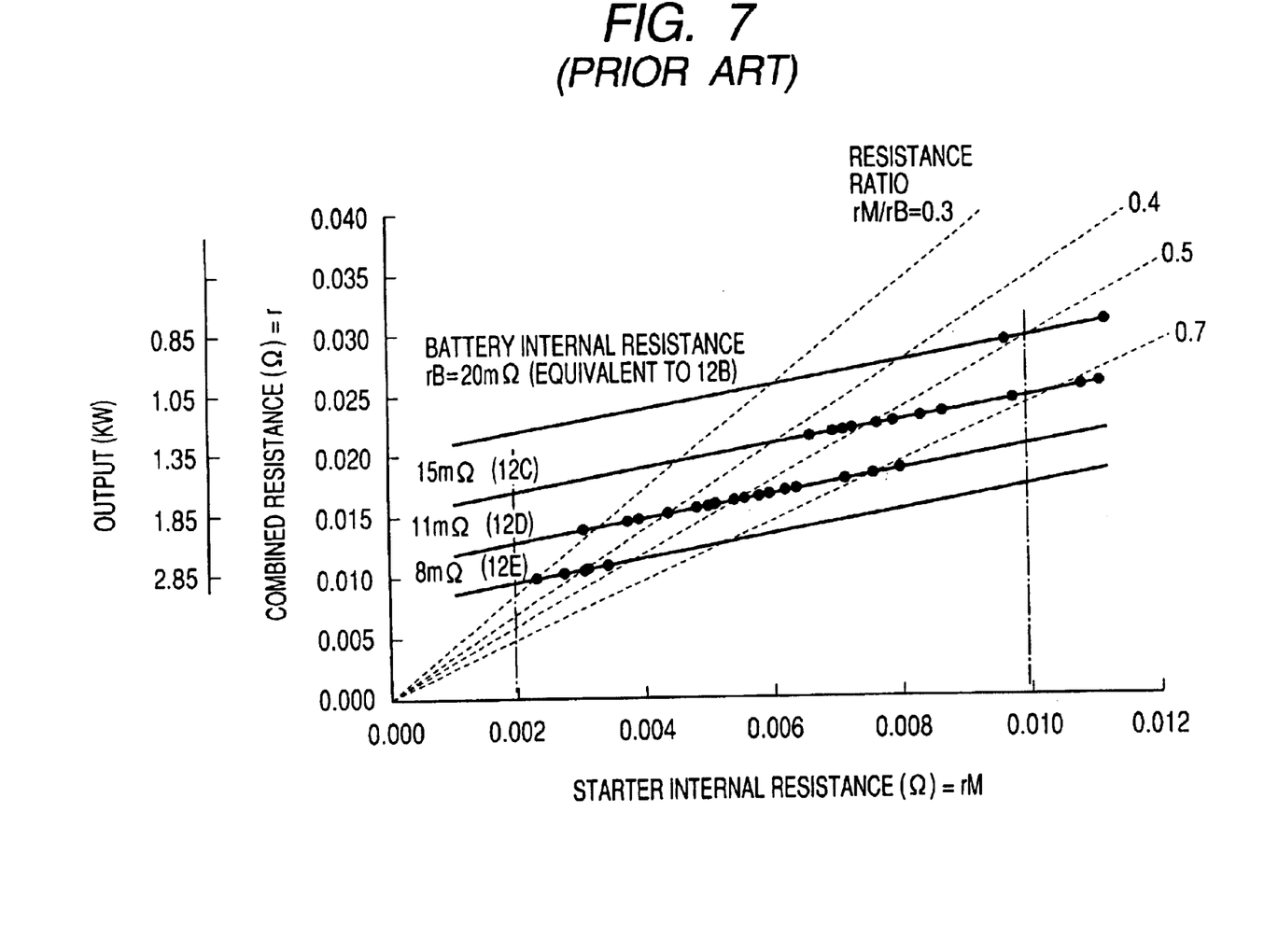
FIG. 7 is a graph showing a theoretical relationship between the combined resistance and a starter internal resistance.

Furthermore, the starter output should be evaluated from various view points other than the size. FIG. 7 is a graph showing the relationship between the battery resistance and the starter resistance calculated according to the above-described equation (2). In this graph, solid lines represent the relationship between the starter internal resistance $r_M$ and the combined resistance r for various values of the battery internal resistance $r_B$. Each black dot mark shown in the graph indicates a conventionally used combination of a starter and a battery. Furthermore, dotted lines show the relationship to the resistance ratio $r_M/r_B$. The ordinate axis shows the output obtained from the equation (1), too.

According to this graph, it will be understood that 1.8 KW is producible if an starter of $r_M$=0.01 uses a battery having a small internal resistance (e.g. 12E). However, as indicated by black dot marks, it is a reality that the actual output is limited to 0.8 KW when combined with a battery of 12B from the consideration that the starter performance should be suppressed in view of heat resistivity.

On the other hand, a starter of $r_M$=0.002 can produce 3.0 KW when combined with a battery of 12E and produce approximately 1.2 KW when combined with a battery of 12B. This is almost the same as an output producible when a starter of $r_M$=0.01 uses a battery of 12C. In this case, as indicated by black dot marks, a starter is usually combined with a battery of 12E to produce 3.0 KW. Namely, from FIG. 7, it is apparent that the starter having the resistance ratio equal to or less than 0.4 (i.e. the starter to be improved in compactness) is the one producing a higher output equal to or larger than 2.0 KW. It will be understood that a high-output starter produces a great amount of heat and accordingly in the design of a starter the first priority is given to the improvement of heat resistivity.

In recent years, automotive vehicles must satisfy the severe requirements in improving their fuel economy. Furthermore, from the view point of reserving valuable global environments, an economy running control is recommended. Furthermore, there is the tenacious requirement for light weight, too. Especially, to carry out the economy running control efficiently, using a high-output starter at a derated output level is effective in attaining satisfactory performances in the durability, fuel economy, and startup operation. For example, according to this design concept, replacing a conventional starter of 1.2 KW with a new starter of 2.0 KW is considered to be advantageous in that a significant merit will be brought to the automotive vehicle as a whole. However, the engine room is very crowded and there is a limited amount of available space remaining in the engine room. Installing a large starter into such a limited narrow space is difficult. Hence, it is realistic to increase the starter output without increasing the starter dimensions. However, as described above, the high-output starters must be sufficiently heat resistant and it is generally difficult to reduce the body size. In short, the low-output starters of 1.0 KW class or less can optimize their motor design. On the other hand, the high-output starters of 2.0 KW class or above cannot employ an ideal (compact) motor design because of the requirement of suppressing heat generation.

SUMMARY OF THE INVENTION

In view of the above-described problems, the present invention has an object to provide a starter capable of solving the above-described problems.

To solve the above-described drawbacks, the present invention makes clear a specific portion of the starter where the heat generation is hard and positively cools this heat-generating portion regardless of the coil width L, thereby effectively suppressing the temperature rise even when the starter is downsized. Thus, the present invention makes it possible to employ an optimized L/D value and provides a compact and high-output starter.

Usually, the starter is a short-time rated motor that is inherently irrelevant to the temperature rise. In other words, the engine usually completes its startup operation within 0.7 sec. And, accordingly the engine starter operation stops without causing substantial temperature rise. Furthermore, during the time required for supplying the electric power to the starter, the time for the maximum current (i.e. lock current) is not longer than 0.1 sec. Almost all of the remaining power supply time is for a non-load current (approximately 70A). This non-load current is almost constant regardless of the capacity of the starter. In other words, during almost all of the engine startup duration, the heat generation amount can be suppressed to the level of approximately $70 \times 70 \times r_M$. A small-capacity starter is rather disadvantageous not only in its smallness but also in this point. Nevertheless, many small-size starters can be practically used. This fact is an evidence that there is no problem in the temperature rise as long as the starter is used for an ordinary engine startup operation.

For example, regarding the heat resistivity of the starter, there will be the following two requirements.

I. After the engine starts its operation, the starter must be durable to a certain extent (e.g. a predetermined time) even if the motor continues rotating.

II. When the engine startup operation is very bad, the starter must be durable to a certain extent (e.g. a predetermined time) even if the driver repeats the turning-on operation of the key switch.

Figure 8:
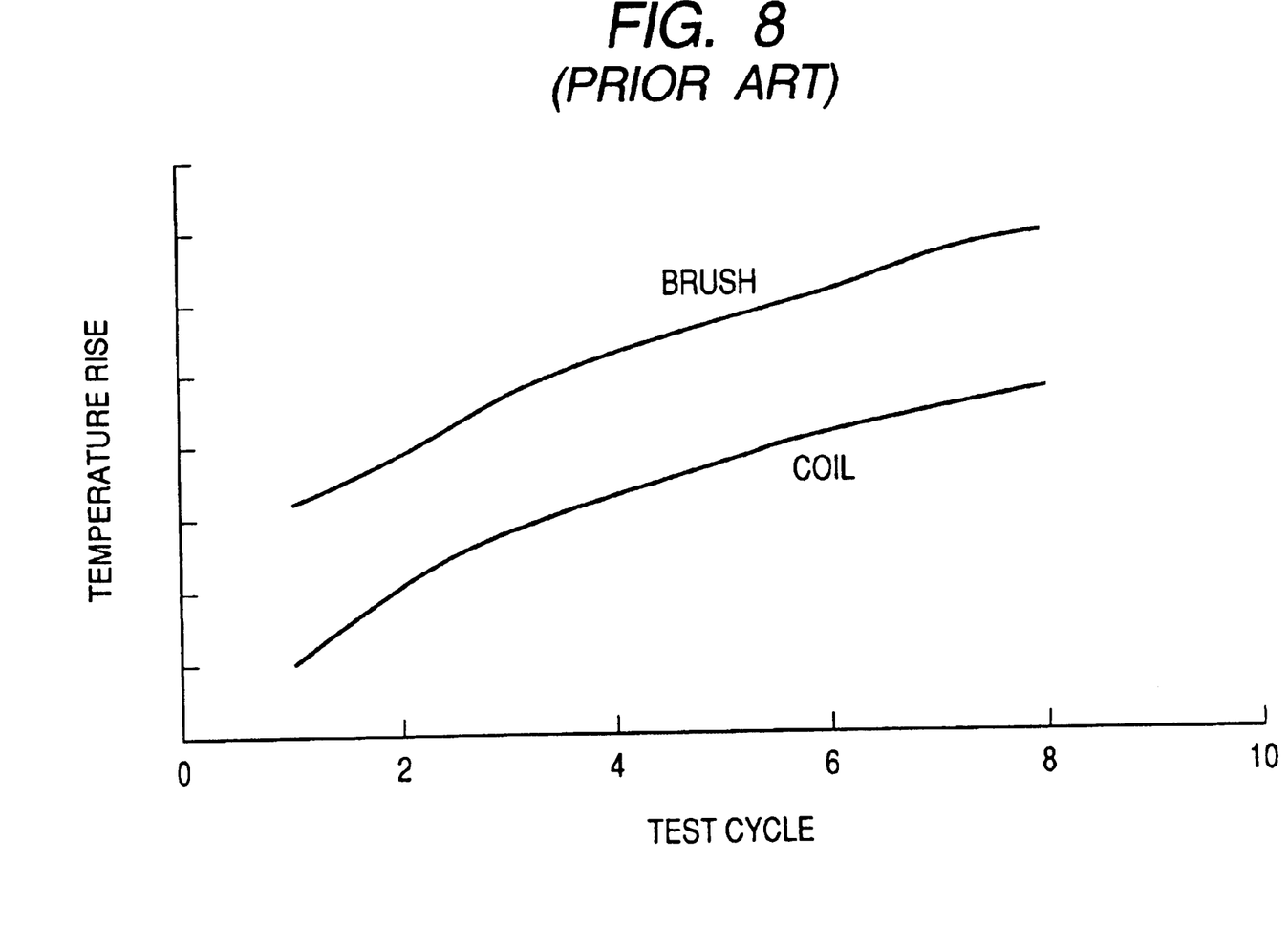
FIG. 8 is a graph showing the result of a temperature rise test conducted for a conventional starter of 1.5 KW class.

The above requirement I is not so relevant to the largeness of $r_M$. FIG. 8 shows the temperature rise in the starter after the engine starts its operation. From this graph, it is understood that a high-temperature portion is a brush contact portion that is not related to the armature size. FIG. 8 shows test data obtained from a simulation test that simulates long-lasting continuous starter operations under an abnormal condition. According to this simulation test, a single complete cycle consists of a 10-second supply of 350A current and a succeeding 10-second stop of the power supply.

This is apparent from the equation (3) and the above-described representative example. A half of $r_M$ is $r_A$ and the rest is $r_T$. The heat generation amount is almost the same. However, the armature and the brush are greatly different in their volumes. In other words, the heat capacity of the brush is greatly different from the heat capacity of the brush. Furthermore, this frictional contact portion is mechanically subjected to a great amount of generated heat. Accordingly, reducing the heat generation amount at this specific portion or intensively cooling this portion can effectively eliminate the problems even if the coil width L of the armature is decreased. Furthermore, when the engine has already started, no power supply to the motor is necessary. Thus, monitoring the engine operation and positively stopping the power supply to the motor after succeeding in the startup of the engine is preferable. If such a control mechanism is employed, a required power supply time will be 0.3 sec or less. From this aspect, the heat generation will be suppressed greatly.

The above requirement II relates to a special occasion that a selected combination of a starter and a battery cannot produce an output sufficient or suitable for a required load of this starter when the engine starts rotating.

Accordingly, the engine will continuously fail to start. Hence, monitoring such a situation by using a sensor and stopping the power supply to the starter is preferable. Alternatively, stopping the power supply when the temperature exceeds a certain level is effective in suppressing the temperature rise in the starter.

Namely, almost half of the generated heat derives from the brush and its frictional contact portion whose heat capacities are relatively small. From this fact, as one of the key factors in suppressing the temperature rise in the starter, an appropriate means for reducing the heat generation amount from the brush and its frictional contact portion or intensively cooling these portions should be provided. Another key factor is immediately stopping the power supply to the starter after succeeding in engine startup operation. Providing such a temperature-rise suppressing means can realize a compact, light weight, and high-output starter.

In view of the foregoing, the present invention provides a first starter or an internal combustion engine that receives electric power from a battery, including a pinion meshing with a ring gear of an internal combustion engine, and a motor section including a yoke and an armature for driving the pinion via a speed-reduction mechanism, wherein an internal resistance $r_M$ of the motor section and an internal resistance $r_B$ of the battery satisfy a relationship that a resistance ratio $r_M/r_B$ is equal to or less than 0.4, an axial length L of a coil constituting the armature and an outer diameter D of the armature (i.e. core) satisfy a relationship that a ratio L/D is equal to or less than 1.0, and a means for suppressing temperature rise in the starter is provided. According to this arrangement, a high-output starter can possess a sufficiently small ratio L/D without causing abnormal temperature rise. Namely, decreasing L can lower the resistance when D is fixed. The output increases. Alternatively, decreasing L largely compared with reduced D can assure the required output. In any case, under the restriction such that D cannot be increased sufficiently from the unchangeable relationship to the ring gear, this invention brings the effect of increasing the output even when the length is reduced. As a result, a high-output starter of 2.0 KW or above can be downsized and becomes compact and light weight.

Preferably, the temperature-rise suppressing means is an excessive current suppressing device provided in an electric power circuit interposing between the battery and the starter. The excessive current suppressing device surely suppresses the temperature rise in the starter and accordingly prevents abnormal heat generation or burnout of a high-output starter even if it is downsized.

Preferably, the excessive current suppressing device is a soft soldering portion provided in the electric power circuit of the starter. This is advantageous in that no special device or mechanism is required and accordingly the high-output starter can be downsized without increasing the cost.

Preferably, the temperature-rise suppressing means includes a control unit that stops electric power supply from the battery to the starter in response to a signal indicating startup of the internal combustion engine, thereby preventing the temperature rise in the starter. The control unit can surely suppress the temperature rise in the starter. Thus, the starter can be downsized sufficiently. For example, the economy running control can be carried out with a control circuit operable in accordance with the engine conditions. In such a case, this control circuit can be directly used as the control unit for controlling the electric power supply to the starter. In other words, no special or additional device is necessary.

Preferably, the temperature-rise suppressing means includes a cooling device that supplies cooling air to the starter. The cooling air can surely suppress the temperature rise. Thus, the high-output starter can be sufficiently downsized. The motor section tends to be especially crowded and accordingly introducing the cooling air to the motor section brings remarkable effects in suppressing the temperature rise.

Preferably, the cooling device causes the armature to rotate as a fan for producing the cooling air. The cooling arrangement is simple.

Furthermore, it is preferable that the coil constituting the armature has a side surface constituting a commutator and an undercut portion of the commutator acts as the fan for producing the cooling air. No special constituent parts or components are required for cooling the starter.

Furthermore, the present invention provides a second starter for an internal combustion engine that receives electric power from a battery, including a pinion meshing with a ring gear of an internal combustion engine, a motor section including a yoke and an armature for driving the pinion via a speed-reduction mechanism, a stationary contact positioned at one end of a terminal provided in the starter and connected to a battery cable for supplying electric power from the battery to the starter, and a movable contact directly connected to a pigtail of a brush of the motor section and cooperative with the stationary contact to constitute a switch, wherein an internal resistance $r_M$ of the motor section and an internal resistance $r_B$ of the battery satisfy a relationship that a resistance ratio $r_M/r_B$ is equal to or less than 0.4, an axial length L of a coil constituting the armature and an outer diameter D of the armature satisfy a relationship that a ratio L/D is equal to or less than 1.0, and a means for suppressing temperature rise in the starter is provided.

According to this arrangement, the power current is supplied through only one contact portion between the battery cable and the brush pigtail. The frictional contact portion of the brush and the commutator is the place where the temperature rise is very large. Accordingly, it is possible to transfer the heat generated from the frictional contact portion of the brush and the commutator to the battery cable with a relatively small thermal resistance. As a result, the thick battery cable can be used as a cooler or a cooling fin. This effectively prevents the high-output starter from being subjected to abnormal temperature rise. The value L/D can be decreased. The starter can be downsized.

Preferably, the movable contact and the pigtail are fixed by a soft solder. The pigtail has a higher temperature. The soft solder can act as a fuse if a large current flows across the pigtail.

Moreover, the present invention provides a permanent magnet field type starter for an internal combustion engine that receives electric power from a battery, including a pinion meshing with a ring gear of an internal combustion engine, and a motor section including a yoke and an armature for driving the pinion via a speed-reduction mechanism, wherein when $r_B$ represents an internal resistance of the battery, $r_T$ represents an overall brush resistance including a contact resistance to a brush and a commutator, and $r_A$ represents an armature resistance, the internal resistance $r_B$ of the battery and the internal resistance $r_M$ ($r_M=r_T+r_A$) of the motor section satisfy a relationship that a resistance ratio $r_M/r_B$ is equal to or less than 0.4, an axial length L of a coil constituting the armature and an outer diameter D of the armature satisfy a relationship that a ratio L/D is equal to or less than 1.0, and the overall brush resistance $r_T$ is smaller than the armature resistance $r_A$, and the overall brush resistance $r_T$ is equal to or less than 1.5 mΩ.

The brush portion generates a great amount of heat and has a small heat capacity. Thus, the temperature of the brush portion tends to increase greatly. Setting the overall resistance $r_T$ of the brush portion to be smaller then the armature resistance $r_A$ is effective in suppressing the temperature rise in the starter and also in reducing the motor internal resistance $r_M$. Attaining higher output and improving the cooling ability can be easily realized for the starter.

Preferably, the brush is a metal graphite brush containing copper by 80% or more. This is easily realized by changing the material of the brush, without increasing the cost.

BRIEF DESCRIPTION OF THE DRAWINGS

The above and other objects, features and advantages of the present invention will become more apparent from the following detailed description which is to be read in conjunction with the accompanying drawings, in which.

DESCRIPTION OF THE PREFERRED EMBODIMENT

A preferred embodiment of the present invention will be explained hereinafter with reference to attached drawings.

As shown in FIGS. 9 through 13, an armature 10 includes a core 11 and a coil 12. A yoke 20 includes a permanent magnet 22 and a casing 21. The yoke 20 and the armature 10 cooperatively constitute a motor section 1. The coil 12 has two coil end portions 12a and 12b at both ends in the axial direction. One coil end portion 12a has a function of acting as a commutator at a side surface of the core 11. The commutator 12a is retracted at its undercut portion 13. The commutator 12a can rotate in accordance with the rotation of the armature 10 so as to act as a centrifugal fan. As a result, the cooling air flows toward the undercut portion 13. The fan effect of the commutator 12a causes the cooling air introduced from the inlet port 61a of the cover 61 to pass the undercut portion 13 and cool the frictional contact portion of the commutator 12a and the brush 30, and then exit out of an output port 21a of a yoke casing 21. Although the inlet port 61a according to this embodiment is provided on the cover 61, it is possible to provide the inlet port 61a at other appropriate portion.

One end of the pigtail 31 of the brush 30 is connected or fixed to a movable contact 41 by means of a soft solder 35. When an excessive current flows across the pigtail 31, or when the power supply continues for a relatively long time, the soft solder 35 fuses in response to the temperature reaching a predetermined level and accordingly stops the power supply. The soft solder 35 can be made of a material having an appropriate melting point. Accordingly, the soft solder 35 can function as a fuse. For example, a tin material is preferably used for the soft solder 35 if required to stop the power supply at the temperature level of approximately 200° C., and a lead material is preferably used for the soft solder 35 if required to stop the power supply at the temperature level of approximately 300° C.

Figure 9:
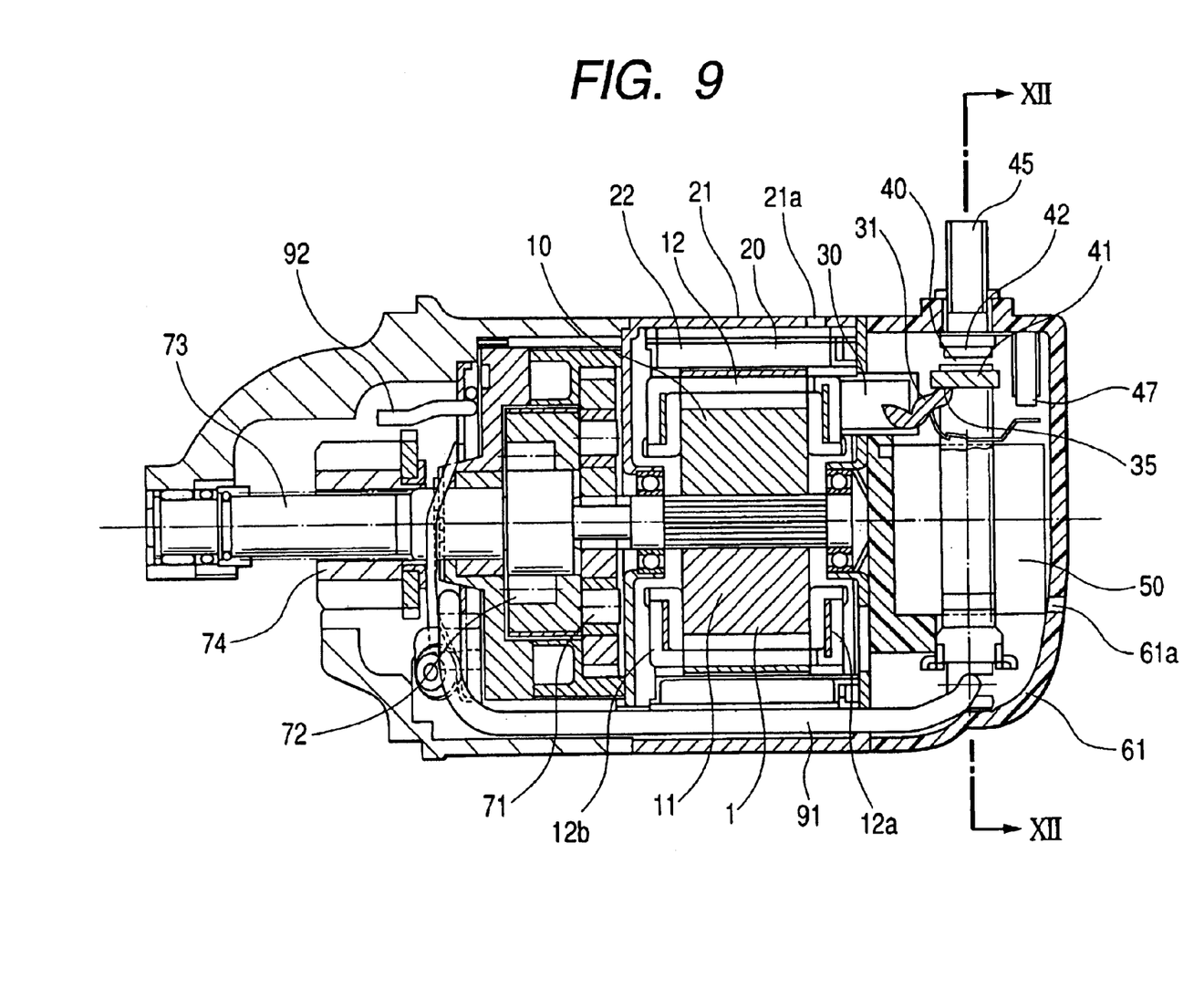
FIG. 9 is a cross-sectional view showing a starter in accordance with an embodiment of the present invention.
Figure 10:
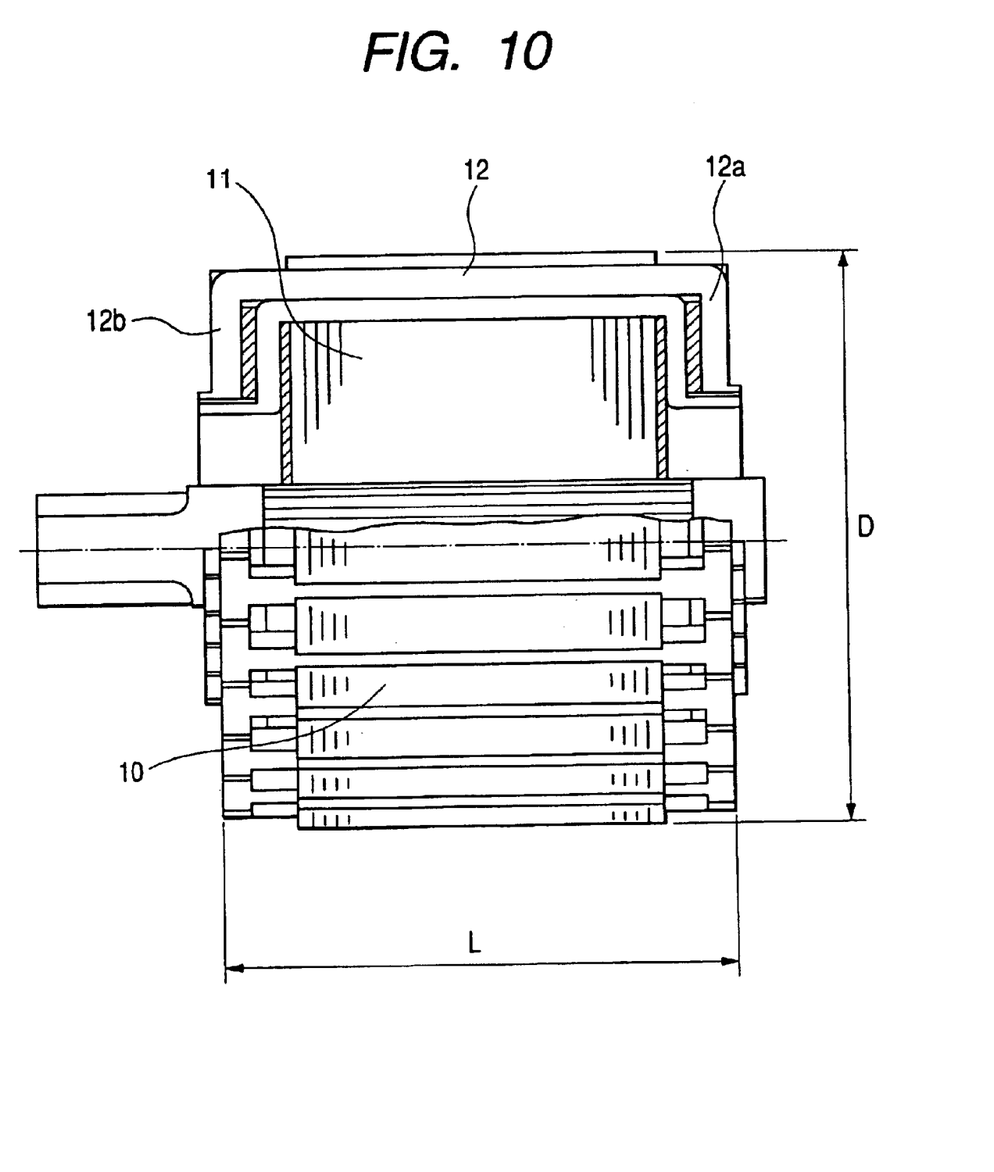
FIG. 10 is a partial cross-sectional view an armature of the starter in accordance with a preferred embodiment of the present invention.
Figure 11:
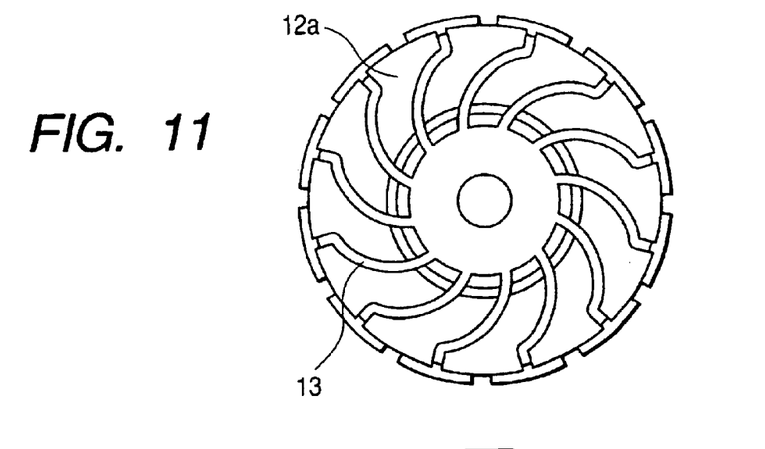
FIG. 11 is a side view showing the armature of the starter in accordance with the preferred embodiment of the present invention.
Figure 12:
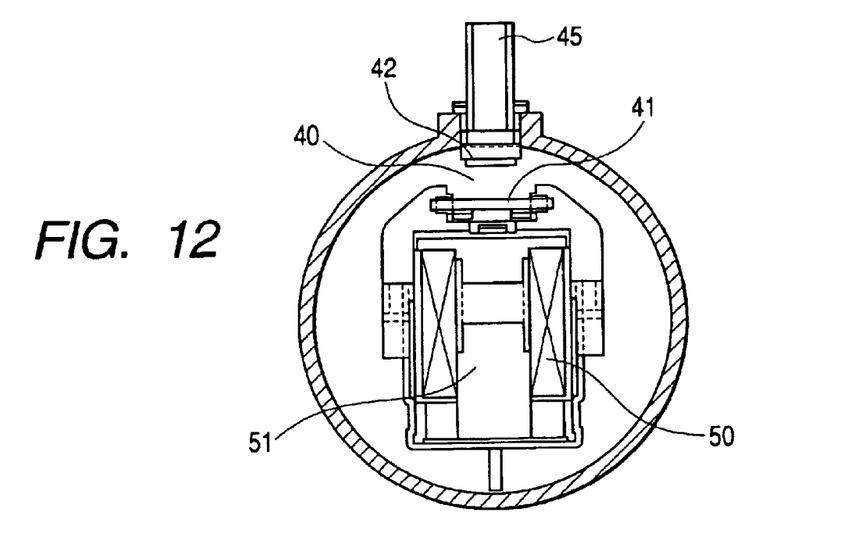
FIG. 12 is a cross-sectional view showing the starter in accordance with the preferred embodiment of the present invention, taken along a line XII—XII of FIG. 9.
Figure 13:
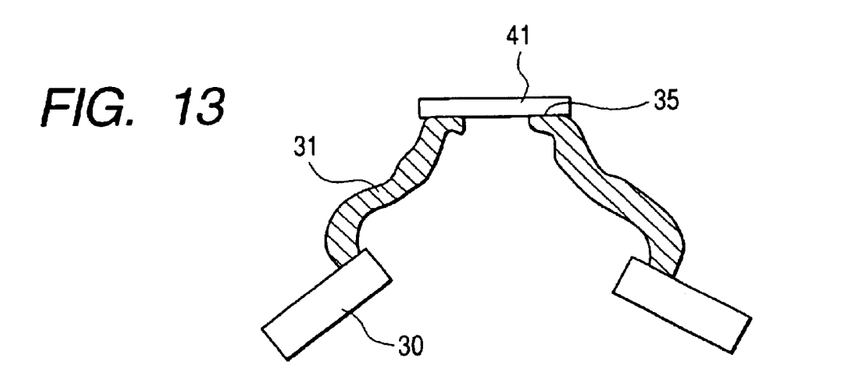
FIG. 13 is a plan view showing a brush and associated parts of the starter in accordance with the preferred embodiment of the present invention.

A stationary contact 42 is provided at one end of a battery terminal 45. The stationary contact 42 and the movable contact 41 cooperatively constitute a main contact portion 40. An electromagnetic solenoid 50 has a plunger 51 movable in its axial direction. Each of a sub contact portion 47 and the main contact portion 40 causes a switch action in response to the movement of the plunger 51. The rotation of the armature 10 is transmitted via a planetary gear type speed-reduction section 71, a clutch section 72, and an output shaft 73 to a pinion 74. The plunger 51 of the electromagnetic solenoid 50 not only moves the switch contact but also moves a rotation restricting bar 92 via a connecting bar 91 to restrict the rotation of the pinion 74. When the rotation of the pinion is restricted, the force generated by the rotation of the motor causes the pinion to shift in the axial direction with the aid of the output shaft 73 having a torsion spline function and causes the pinion to mesh with the ring gear of the engine.

It is now assumed that the resistance of the armature coil 12 is $r_A$ and the resistance of the brush 30 is $r_T$. The overall brush resistance $R_T$ includes a contact resistance of the brush and the commutator 12a. In this case, the motor section 1 has no other portion having a significant electric resistance. Accordingly, a resistance $r_M$ of the motor section 1 can be expressed by an equation $r_M = r_A + r_T$.

Figure 15:
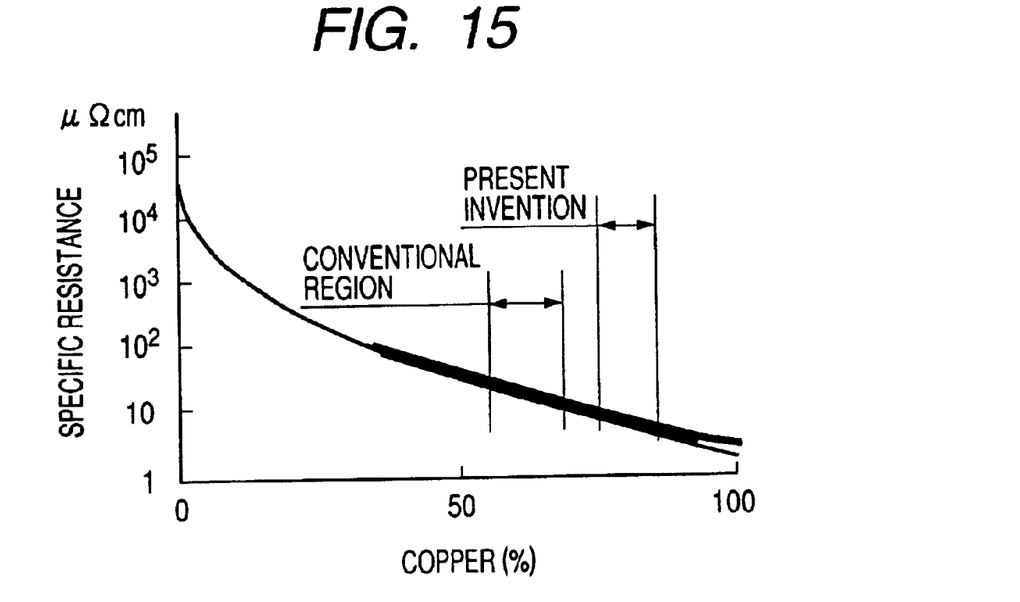
FIG. 15 is a graph showing a relationship between a specific resistance of a metal graphite brush and its copper content.
Figure 16:
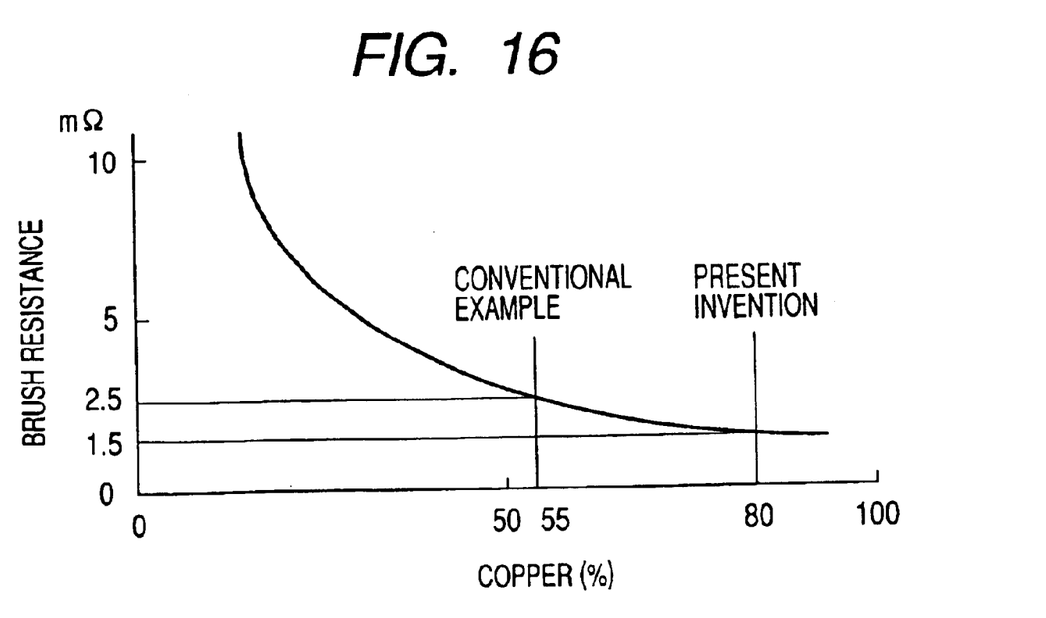
FIG. 16 is a graph sowing a relationship between the copper content of the metal graphite brush and a brush resistance.

As shown in FIG. 15, a metal graphite containing copper of 80% or more has a specific resistance 10 MΩcm or less. The brush of this embodiment is made of the metal graphite having such characteristics. Accordingly, the overall brush resistance $r_T$ is equal to or less than 1.5 mΩ. This relationship is shown in FIG. 16. Furthermore, the relationship $r_A > r_T$ is satisfied. On the other hand, when the width of coil 12 is L and the outer diameter of the armature 10 is D, the relationship L/D<1.0 is satisfied. Namely, as L is smaller than D, the resistance $r_A$ of coil 12 can be reduced. The brush resistance $r_T$ is also small. Thus, the motor resistance $r_M$ can be decreased. The ratio of the motor resistance $r_M$ and the battery internal resistance $r_B$ is equal to or less than 0.4 (i.e. $r_M/r_B < 0.4$).

The battery terminal 45 is connected to the battery via the cable (not shown). Furthermore, although not shown in the drawing, it is preferable that the circuit includes a control unit for immediately stopping the current supply to the motor section of the starter in response to engine startup operation.

The starter of the above-described embodiment will be explained, hereinafter. When a key switch (not shown) is closed, the electromagnetic solenoid 50 moves the plunger 51 that enables a relatively small current (e.g. approximately 200A) to flow into the motor via the sub contact portion 47. The motor starts rotating slowly in response to this power supply. As a result, the pinion meshes with the ring gear under the condition that the pinion is restricted not to rotate. Thereafter, a large current is supplied from the main contact portion 40 and the engine starts rotating. The large current is a maximum current to be supplied and is, for example, approximately 800 A.

Figure 14:
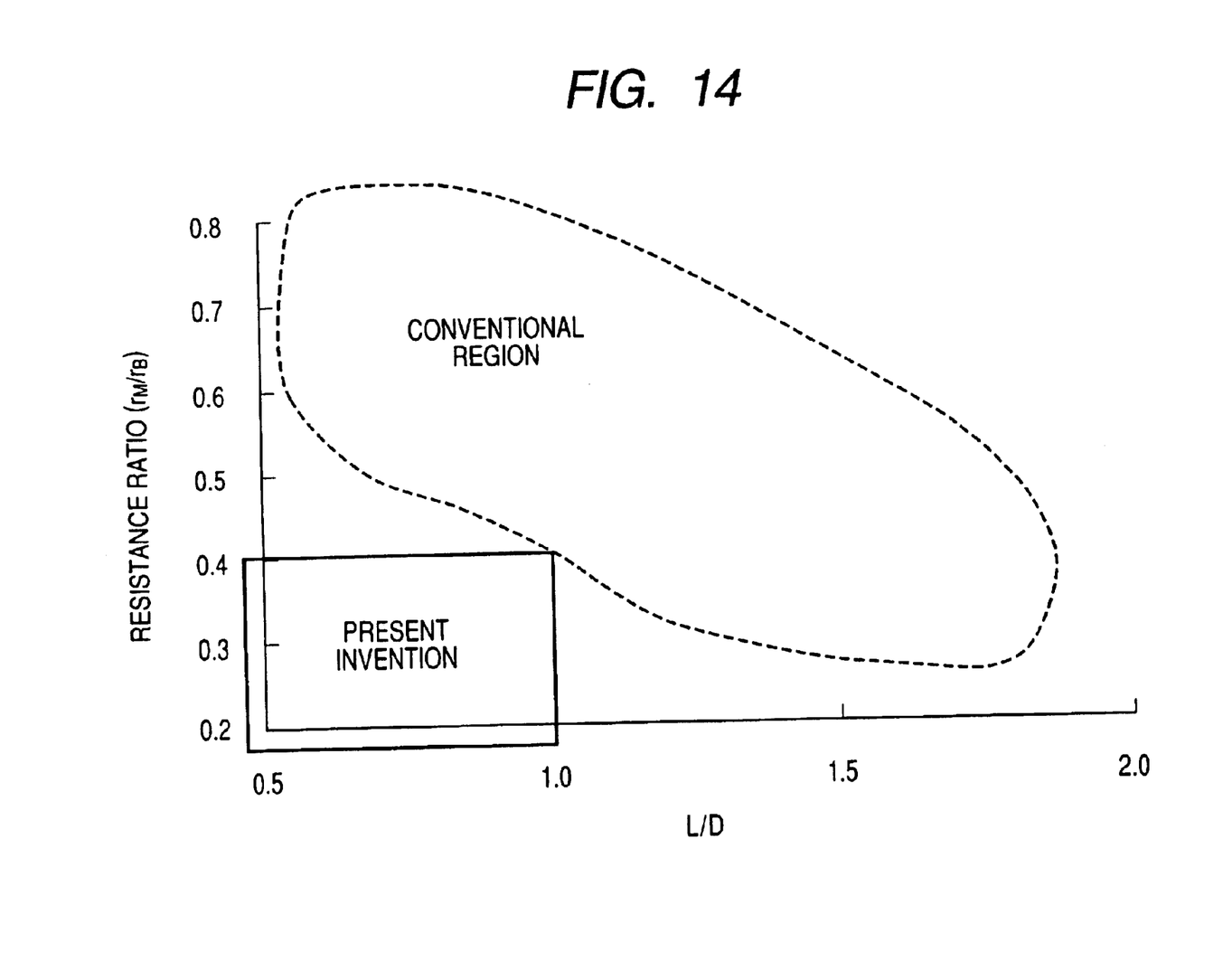
FIG. 14 is a graph showing a target zone of the starter in accordance with the present invention, in the relationship between the resistance ratio and the size ratio L/D.

As described above, compared with a low-output starter, a high-output should decrease the motor resistance $r_M$. To this end, L should be reduced. However, considering the heat capacity, L must be kept as a relatively large value. Hence, D is forcibly increased to decrease the motor resistance $r_M$. In this respect, conventional high-output starters cannot be evaluated as excellent. However, there is an increasing need to use high-output starters for the economy running control. For example, according to the economy running control, the engine is automatically stopped when predetermined conditions are satisfied. As a result, electric power is frequently supplied to the starter to repetitively restart the engine. However, the large size of the starter is a bottleneck in realizing the economy running. However, the present invention aims to realize effective downsizing of a motor section (e.g. L/D<1) in a high-output starter using a large-capacity battery using 2.0 KW or more, i.e., having the resistance ratio $r_M/r_B < 0.4$ as shown in FIG. 14. To this end, the present invention employs various means for suppressing the temperature rise in case of failure.

More specifically, this embodiment uses the following means for suppressing the temperature rise in the starter.

A first temperature-rise suppressing means according to this embodiment is the soft solder used for connecting or fixing the pigtail 31. When the temperature of the pigtail 31 exceeds the melting point of this soft solder, the soft solder fuses and stops the power supply. Accordingly, this effectively prevents the starter from causing abnormal heat generation or prevents starter components from being burned out.

A second temperature-rise suppressing means according to this embodiment is the control device that detects ignition and startup of the engine and optimizes the economy running condition. This effectively prevents the power supply to the starter from being uselessly continued for a long time. Thus, a downsized high-output starter is provided for the economy running control.

A third temperature-rise suppressing means according to this embodiment is supplying the cooling air to the starter to suppress the temperature rise in the starter. Furthermore, this embodiment utilizes the undercut portion of the commutator as a fan. Therefore, no special fan is required. The brush contact portion that causes very high temperature rise can be intensively cooled.

A fourth temperature-rise suppressing means according to this embodiment is releasing the brush heat via the pigtail with no substantial thermal resistance to the thick battery cable. Therefore, the brush portion does not cause extremely high temperature rises. According to this embodiment, only one contact portion is provided. The distance between the brush and the battery terminal is short. The thermal resistance is very small. On the contrary, according to the conventional starter shown in FIG. 1, the distance between the brush 30 and the battery terminal 45 is long and the contact portion is constituted by two serial arranged portions. Thus, thermal resistance is relatively high.

A fifth temperature-rise suppressing means according to this embodiment is using the brush portion made of a material containing an amount of copper that is excellent in both the electric resistance and the thermal resistance, thereby effectively suppressing heat generation from the brush portion.

Figure 17:
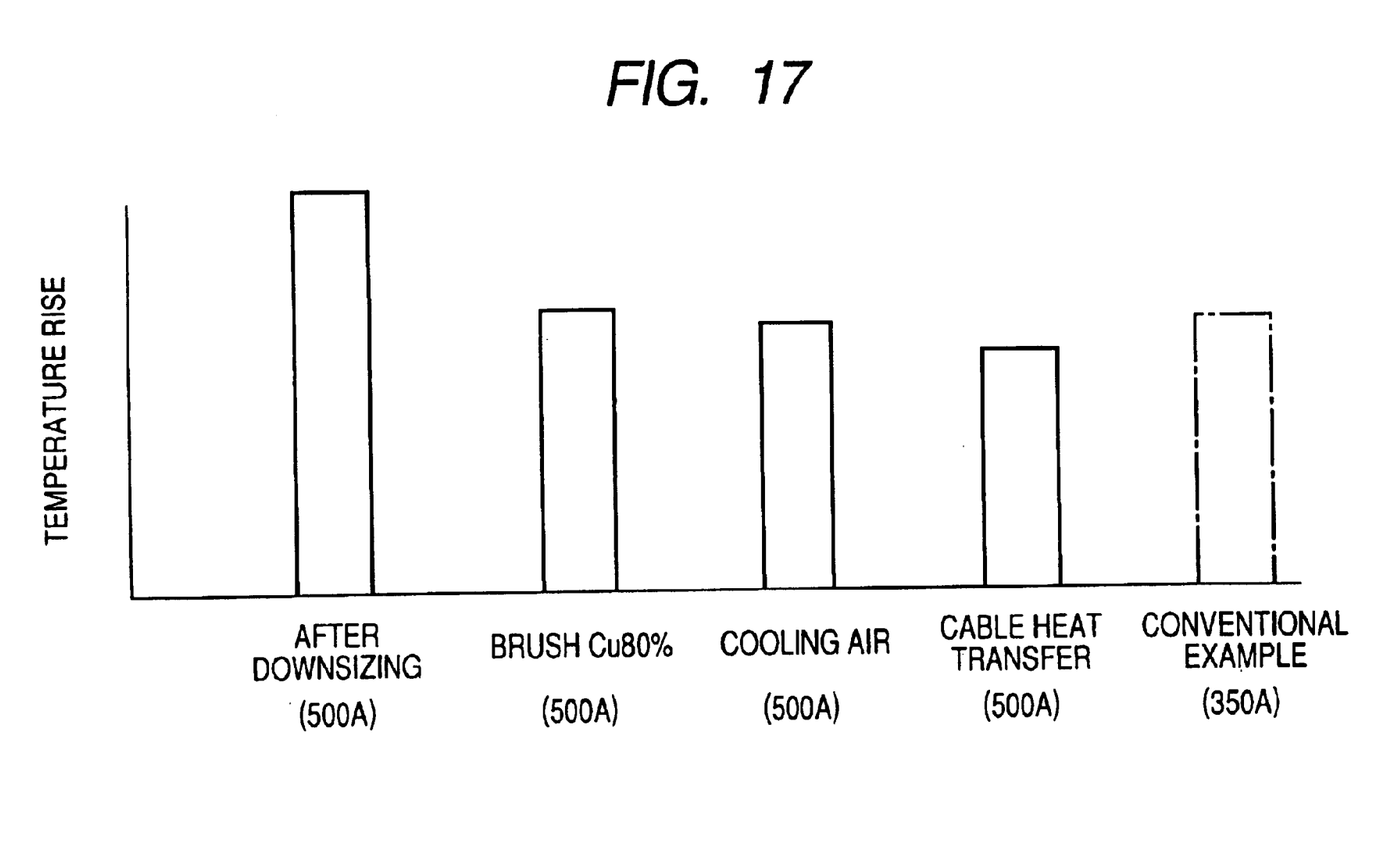
FIG. 17 is a graph showing cooling effects brought by the preferred embodiment of the present invention.

FIG. 17 shows temperature rise appearing at the fifth cycle in a simulation test for supplying electric power of 500A to a starter having a downsized body and capable of outputting 2.0 KW (under the same conditions as those of FIG. 8). The test result shown in FIG. 17 proves that every one of the above-described temperature-rise suppressing means according to this embodiment brings satisfactory improvement. More specifically, even when the starter is downsized and capable of producing an increased power, the temperature rise can be suppressed to a level substantially equivalent to that of a conventional starter of 1.5 KW class (i.e. the one tested at 350A in FIG. 17).

The temperature-rise suppressing means according to this embodiment can be combined variously. For example, two or more of the first to fifth temperature-rise suppressing means can be combined appropriately considering a target output level and assuming an abnormal condition to be eliminated.

As described above, this embodiment enables a motor designer or a maker to provide an optimized high-output starter having a compact and lightweight body and usable for the economy running control.

What is claimed is:

1. A starter for an internal combustion engine that receives electric power from a battery, comprising:

a pinion meshing with a ring gear of an internal combustion engine, and a motor section including a yoke and an armature for driving said pinion via a speed-reduction mechanism, wherein an internal resistance $r_M$ of said motor section and an internal resistance $r_B$ of said battery satisfy a relationship that a resistance ratio $r_M/r_B$ is equal to or less than 0.4, an axial length L of a coil constituting said armature and an outer diameter D of said armature satisfy a relationship that a ratio L/D is equal to or less than 1.0, and a temperature-rise suppressing means for preventing temperature rise in said starter is provided.

2. The starter for an internal combustion engine in accordance with claim 1, wherein said temperature-rise suppressing means is an excessive current suppressing device provided in an electric power circuit interposing between said battery and said starter.

3. The starter for an internal combustion engine in accordance with claim 2, wherein said excessive current suppressing device is a soft soldering portion provided in said electric power circuit of said starter.

4. The starter for an internal combustion engine in accordance with claim 1, wherein said temperature-rise suppressing means includes a control unit that stops electric power supply from said battery to said starter in response to a signal indicating startup of said internal combustion engine, thereby suppressing the temperature rise in the starter.

5. The starter for an internal combustion engine in accordance with claim 1, wherein said temperature-rise suppressing means includes a cooling device that supplies cooling air to said starter.

6. The starter for an internal combustion engine in accordance with claim 5, wherein said cooling device causes said armature to rotate as a fan for producing said cooling air.

7. The starter for an internal combustion engine in accordance with claim 6, wherein the coil constituting said armature has a side surface constituting a commutator and an undercut portion of said commutator acts as said fan for producing said cooling air.

8. A starter for an internal combustion engine that receives electric power from a battery, comprising:

a pinion meshing with a ring gear of an internal combustion engine, a motor section including a yoke and an armature for driving said pinion via a speed-reduction mechanism, a stationary contact positioned at one end of a terminal provided in said starter and connected to a battery cable for supplying electric power from said battery to said starter, and a movable contact directly connected to a pigtail of a brush of said motor section and cooperative with said stationary contact to constitute a switch, wherein an internal resistance $r_M$ of said motor section and an internal resistance $r_B$ of said battery satisfy a relationship that a resistance ratio $r_M/r_B$ is equal to or less than 0.4, an axial length L of a coil constituting said armature and an outer diameter D of said armature satisfy a relationship that a ratio L/D is equal to or less than 1.0, and a means for suppressing temperature rise in said starter is provided.

9. The starter for an internal combustion engine in accordance with claim 8, wherein said movable contact and said pigtail are fixed by a soft solder.

10. A permanent magnet field type starter for an internal combustion engine that receives electric power from a battery, comprising:

a pinion meshing with a ring gear of an internal combustion engine, and a motor section including a yoke and an armature for driving said pinion via a speed-reduction mechanism, wherein when $r_B$ represents an internal resistance of said battery, $r_T$ represents an overall brush resistance including a contact resistance to a brush and a commutator, and $r_A$ represents an armature resistance, the internal resistance $r_B$ of said battery and the internal resistance $r_M$ ($r_M=r_T+r_A$) of said motor section satisfy a relationship that a resistance ratio $r_M/r_B$ is equal to or less than 0.4, an axial length L of a coil constituting said armature and an outer diameter D of said armature satisfy a relationship that a ratio L/D is equal to or less than 1.0, and said overall brush resistance $r_T$ is smaller than said armature resistance $r_A$, and said overall brush resistance $r_T$ is equal to or less than 1.5.

11. The starter for an internal combustion engine in accordance with claim 10, wherein said brush is a metal graphite brush containing copper by 80% or more.

* * * * *